United States Patent
Nussbaum et al.

(10) Patent No.: US 8,281,185 B2
(45) Date of Patent: Oct. 2, 2012

(54) ADVICE-BASED FEEDBACK FOR TRANSACTIONAL EXECUTION

(75) Inventors: Daniel S. Nussbaum, Cambridge, MA (US); David Dice, Foxboro, MA (US); Martin Karlsson, San Francisco, CA (US); Mark S. Moir, Hampton, NH (US)

(73) Assignee: Oracle America, Inc., Redwood Shores, CA (US)

( * ) Notice: Subject to any disclaimer, the term of this patent is extended or adjusted under 35 U.S.C. 154(b) by 210 days.

(21) Appl. No.: 12/494,934

(22) Filed: Jun. 30, 2009

(65) Prior Publication Data

US 2010/0332901 A1 Dec. 30, 2010

(51) Int. Cl.
*G06F 11/00* (2006.01)
(52) U.S. Cl. ............... 714/15; 714/16; 707/703
(58) Field of Classification Search ............ 714/15, 714/16; 707/683, 703
See application file for complete search history.

(56) References Cited

U.S. PATENT DOCUMENTS

| | | | |
|---|---|---|---|
| 5,530,855 A * | 6/1996 | Satoh et al. ............... 707/648 |
| 5,551,023 A * | 8/1996 | Alonso ..................... 707/703 |
| 5,613,106 A * | 3/1997 | Thurman et al. ........... 707/648 |
| 5,850,507 A * | 12/1998 | Ngai et al. ................. 714/16 |
| 5,948,112 A * | 9/1999 | Shimada et al. ............ 714/16 |
| 6,018,746 A * | 1/2000 | Hill et al. .................. 707/679 |
| 6,154,847 A * | 11/2000 | Schofield et al. .......... 714/4.4 |
| 6,182,241 B1 * | 1/2001 | Ngai et al. ................. 714/16 |
| 6,295,610 B1 * | 9/2001 | Ganesh et al. ............ 714/19 |
| 7,065,537 B2 * | 6/2006 | Cha et al. ................. 707/648 |
| 7,395,382 B1 * | 7/2008 | Moir ........................ 711/147 |
| 7,516,366 B2 * | 4/2009 | Lev et al. ................. 714/38.13 |
| 7,840,530 B2 * | 11/2010 | Magruder et al. ......... 707/609 |
| 2002/0178395 A1 * | 11/2002 | Chen et al. ................ 714/2 |
| 2006/0294326 A1 * | 12/2006 | Jacobson et al. .......... 711/156 |
| 2009/0307301 A1 * | 12/2009 | Ikenaga et al. ............ 709/202 |
| 2009/0327806 A1 * | 12/2009 | Majumdar et al. ........ 714/15 |
| 2010/0121824 A1 * | 5/2010 | Kawamura et al. ....... 707/683 |
| 2010/0211822 A1 * | 8/2010 | Colaiacomo et al. ...... 714/16 |

* cited by examiner

*Primary Examiner* — Yolanda L Wilson
(74) *Attorney, Agent, or Firm* — Park, Vaughan, Fleming & Dowler LLP; Chia-Hsin Suen

(57) ABSTRACT

One embodiment provides a system that facilitates the execution of a transaction for a program in a hardware-supported transactional memory system. During operation, the system records a failure state of the transaction during execution of the transaction using hardware transactional memory mechanisms. Next, the system detects a transaction failure associated with the transaction. Finally, the system provides an advice state associated with the recorded failure state to the program to facilitate a response to the transaction failure by the program.

17 Claims, 4 Drawing Sheets

ADVICE-BASED FEEDBACK FOR TRANSACTIONAL EXECUTION

RELATED APPLICATION

The subject matter of this application is related to the subject matter in a co-pending non-provisional application by the same inventors as the instant application and filed on 29 Jun. 2009 entitled "Facilitating Transactional Execution Through Feedback About Misspeculation," having Ser. No. 12/493,447.

BACKGROUND

1. Field

The present embodiments relate to techniques for improving the performance of computer systems. More specifically, the present embodiments relate to a method and system for providing advice regarding options for responding to transaction failures in a transactional memory system.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase computational performance. However, as microprocessor performance continues to increase, the time spent synchronizing between threads (processes) is becoming a large fraction of overall execution time. In fact, as multi-threaded applications begin to use even more threads, this synchronization overhead often becomes the dominant factor in limiting application performance.

From a programmer's perspective, synchronization is typically accomplished through the use of locks. A lock is usually acquired before a thread enters a critical section of code, and is released after the thread exits the critical section. If another thread wants to enter a critical section protected by the same lock, it must acquire the same lock. If it is unable to acquire the lock, because a preceding thread has acquired the lock, the thread must wait until the preceding thread releases the lock. (Note that a lock can be implemented in a number of ways, such as through atomic operations or semaphores.)

Unfortunately, the process of acquiring a lock and the process of releasing a lock can be very time-consuming in modern microprocessors. They typically involve atomic operations, which flush load and store buffers, and can consequently require hundreds, if not thousands, of processor cycles to complete.

Moreover, as multi-threaded applications use more threads, more locks are required. For example, if multiple threads need to access a shared data structure, it is often impractical for performance reasons to use a single lock for the entire data structure. Instead, it is often preferable to use multiple fine-grained locks to lock small portions of the data structure. This allows multiple threads to operate on different portions of the data structure in parallel. However, it may also require a single thread to acquire and release multiple locks in order to access different portions of the data structure. It also introduces other concerns, such as avoiding deadlock.

To reduce overhead involved in lock-based execution of critical sections, a critical section may be transactionally executed. In particular, changes made during transactional execution of the critical section may not be committed to the architectural state of the processor until the transactional execution successfully completes. Furthermore, the transactional execution may be carried out using "best effort" transactional execution mechanisms that do not prevent architecture-specific limitations of the processor from failing transactions.

Mechanisms for supporting hardware transactional memory have a lot in common with mechanisms used for speculation. For example, a processor may perform a load, which results in a cache miss. Rather than simply waiting for the load to complete, the processor may continue executing subsequent instructions until the result of the load miss is needed. Even if the result of the load miss is needed (e.g., the value from the load is needed to determine the outcome of a branch instruction), the processor may be able to continue execution. Rather than waiting for the load to complete, the processor may assume that the branch is correctly predicted, and continue executing with that assumption.

Unfortunately, failures in transactional and/or speculative execution may be difficult to diagnose. For example, a failed transaction may be caused by a conflicting memory access or an architecture-specific limitation of the processor on which the transaction is executing. In addition, the optimal response to failed transactional and/or speculative execution may depend on the cause(s) of the failed execution. For example, a transaction failure that occurs due to a conflicting memory access or misspeculation may be remedied by retrying the transaction, while a transaction failure caused by an instruction that is not supported by "best effort" transactional execution mechanisms may require bypassing the transaction using an alternative code path.

Hence, what is needed is a mechanism for facilitating the diagnosis of and response to failures associated with "best effort" transactional execution and/or speculative execution.

SUMMARY

One embodiment provides a system that facilitates the execution of a transaction for a program in a hardware-supported transactional memory system. During operation, the system records a failure state of the transaction during execution of the transaction using hardware transactional memory mechanisms. Next, the system detects a transaction failure associated with the transaction. Finally, the system provides an advice state associated with the recorded failure state to the program to facilitate a response to the transaction failure by the program.

In some embodiments, the advice state is used by the program to retry the transaction, perform a remedial action to address a source of the transaction failure, or bypass the transaction.

In some embodiments, bypassing the transaction failure involves executing an alternative code path provided by software transactional execution mechanisms.

In some embodiments, bypassing the transaction failure involves executing a critical section while holding a lock.

In some embodiments, the failure state and the advice state are recorded in a checkpoint status (CPS) register associated with the program.

In some embodiments, the failure state is recorded using a set of failure bits in the CPS register.

In some embodiments, the advice state is calculated using the failure bits.

In some embodiments, the advice state is further calculated using at least one of a program counter, a recent transaction attempt, a number of cache misses encountered during the transaction, an address associated with the transaction failure, and a processor version associated with the hardware-supported transactional memory system.

In some embodiments, the advice state is provided using a set of advice bits in the CPS register.

In some embodiments, the advice bits encode an advice code corresponding to no advice, retry immediately, retry after a delay, retry with remediation, or unlikely to succeed.

BRIEF DESCRIPTION OF THE FIGURES

In the figures, like reference numerals refer to the same figure elements.

DETAILED DESCRIPTION

Figure 1:
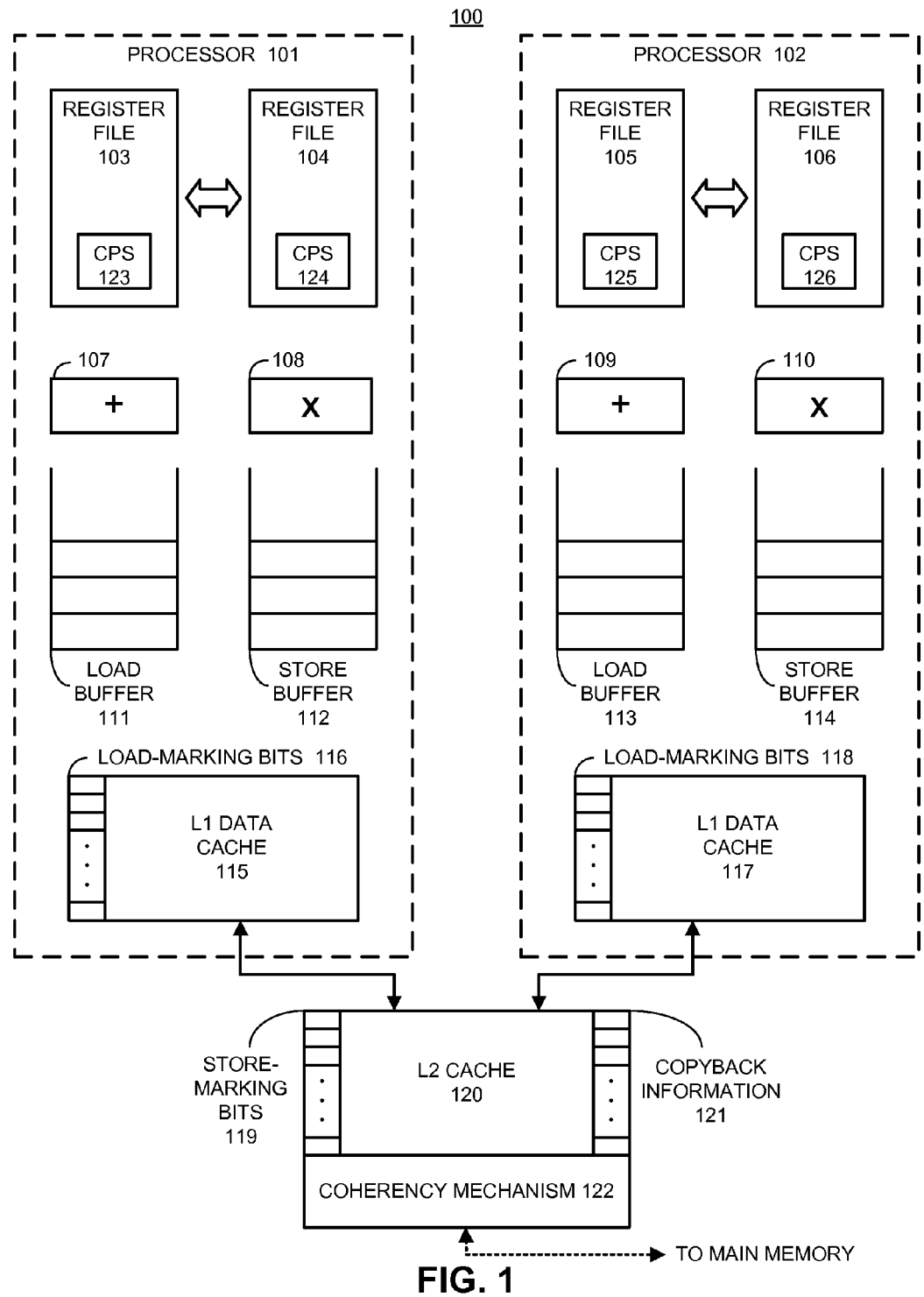
FIG. 1 shows a computer system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

One or more embodiments provide a method and system for facilitating the execution of a transaction on a processor. The transaction may be part of a program that is executed within a hardware-supported transactional memory system. The transaction may also be supported using software transactional execution mechanisms. In other words, the transaction may be used as a concurrency control mechanism by enabling a group of instructions to execute atomically without the drawbacks of traditional lock-based synchronization.

More specifically, one or more embodiments provide a method and system for providing advice-based feedback regarding a transaction failure. The feedback may be provided by recording a failure state of the transaction during execution of the transaction. If the transaction fails, an advice state associated with the failure state is provided to the program to enable the program to respond to the transaction failure. The advice state may then be used by the program to rectify the transaction failure by retrying the transaction (e.g., immediately or after a delay), performing a remedial action to address a source of the transaction failure, and/or bypassing the failure.

In one or more embodiments, the failure state and advice state are recorded in a register associated with the program. The register may include a set of failure bits that denote various possible causes of the transaction failure. A failure bit may be set if the transaction failure may be due to the corresponding failure cause represented by the failure bit. The register may also include a set of advice bits that represent the advice state for the transaction failure. For example, the register may include a set of advice bits that encode one of a set of possible advice codes: no advice, retry immediately, retry after a delay, retry with remediation, or unlikely to succeed.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As shown in FIG. 1, computer system 100 includes processors 101-102 and level 2 (L2) cache 120, which is coupled to main memory (not shown). Processors 101-102 may be used to execute a program on computer system 100 as a sequence of instructions. Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support transactional execution of a program on processor 101.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that lines in L1 data cache 115 include load-marking bits 116, which indicate that a data value from the line has been loaded during transactional execution. These load-marking bits 116 are used to determine whether any interfering memory references take place during execution of a transaction. Processor 101 also includes an L1 instruction cache (not shown).

Note that load-marking does not necessarily have to take place in L1 data cache 115. In general load-marking can take place at any level cache, such as L2 cache 120, or even in an independent structure. However, for performance reasons, the load-marking will likely take place at the cache level that is as close to the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where a cache line must be sent to another processor.

Each line in L2 cache 120 includes a "store-marking bit," which indicates that a data value has been stored to the line during transactional execution. This store-marking bit is used to determine whether any interfering memory references take place during transactional execution as is described below with reference to FIGS. 3-4. Note that store-marking does not necessarily have to take place in L2 cache 120.

Ideally, the store-marking takes place in the cache level closest to the processor where cache lines are coherent. For write-through L1 data caches, writes are automatically propagated to L2 cache 120. However, if an L1 data cache is a write-back cache, store-marking may be performed in the L1 data cache. Consequently, the cache coherence protocol may ensure that any other processor that subsequently modifies the same cache line will retrieve the cache line from the L1 cache, and will hence become aware of the store-mark. Alternatively, the subsequent modification of the cache line may simply cause the transactional execution to abort without notifying the other processor of the store-mark.

In one or more embodiments, the transactional execution mechanisms provided by processor 101 correspond to "best effort" transactional execution mechanisms. Such "best effort" transactional execution mechanisms may allow transactions to fail due to both conflicting memory accesses (e.g., interfering memory references) and architecture-specific limitations of processor 101. "Best effort" transactional execution using load-marking and store-marking is described further in U.S. Pat. No. 7,398,355 (issued Jul. 8, 2008) by inventors Mark S. Moir, Marc Tremblay and Shailender Chaudry, entitled "Avoiding Locks by Transactionally Executing Critical Sections," which is incorporated herein by reference. Transactional execution within computer system 100 is described further in U.S. Pat. No. 7,395,382 (issued Jul. 1, 2008) by inventor Mark S. Moir, entitled "Hybrid Software/Hardware Transactional Memory," which is incorporated herein by reference.

Furthermore, the "best effort" transactional execution mechanisms provided by processor 101 may be provided using alternative means. For example, processor 101 may provide hardware transactional mechanisms using signatures, tokens, metadata in memory (e.g., main memory), and/or metadata embedded in the memory system of computer system 100 (e.g., in parity bits).

The "best effort" transactional execution mechanisms associated with processor 101 may also be used to perform speculative execution of instructions. For example, processor 101 may be used to speculatively execute instructions during a high-latency event such as a cache miss. Furthermore, the various components of processors 101-102 may be used to ensure that effects of speculative execution are not observed until the speculative execution is determined to be correct. For example, speculative stores may be gated in store buffer 112 by processor 101 until the stores can be safely committed to memory. Processor 101 may revert to a previous checkpoint if the speculative execution is determined to be incorrect, a resource (e.g., store buffer 112) on processor 101 is exhausted, and/or an exception or other uncommon event occurs during the speculative execution.

Those skilled in the art will appreciate that a variety of factors may cause a transaction to fail in a "best effort" execution of the transaction. For example, a transaction failure may be caused by a conflicting memory operation, a trap instruction, an unsupported instruction, a precise exception, an asynchronous interrupt, an exceeded queue size, an evicted cache line, a floating point operation, and/or a translation lookaside buffer (TLB) miss during the transaction.

The transaction may also fail due to misspeculation associated with speculative execution of the transaction. For example, processor 101 may perform branch prediction during the transaction following a cache miss on a load and execute a code path that is dependent on the outcome of the load. If the transaction fails during execution of the code path, the transaction may have failed because of an incorrectly predicted branch, value, and/or address (e.g., misspeculation); because of an interfering memory access; and/or because of an event not supported by "best effort" transactional execution (e.g., asynchronous interrupt, TLB miss, unsupported instruction, etc.).

In addition, the program may be responsible for diagnosing and responding to transaction failures. To facilitate responses to transaction failures by the program, processors 101-102 may include functionality to execute transactions as specified by the program, as well as functionality to provide feedback regarding transaction failures to the program. As discussed below, the feedback may include advice regarding options for responding to transaction failures. In other words, the feedback may allow the program to effectively respond to transaction failures by recommending a course of action based on the cause or causes of each transaction failure.

In one or more embodiments, transactional execution of instructions by processor 101 is specified by the program. For example, the program may use a "checkpoint" instruction to begin a transaction and a "commit" instruction to commit the transaction. The "checkpoint" instruction may additionally include a fail address at which control resumes if the transaction aborts (e.g., fails to commit). The program may additionally include one or more instructions for explicitly aborting the transaction.

As shown in FIG. 1, each register file 103-106 may include a checkpoint status (CPS) register 123-126. The CPS register may be used to provide feedback about the causes of a failed transaction. In particular, one or more bits in the CPS register may be set by a failing transaction to indicate one or more reasons as to why a transaction has failed. As a result, the CPS register may enable the program to react to transaction failures by providing information regarding the transaction failures to the program. The CPS register is described in further detail below with respect to FIG. 2.

In one or more embodiments, the CPS register includes a set of failure bits that record a failure state of a transaction during execution of the transaction on a processor 101-102. Each failure bit may be set if a possible cause of transaction failure represented by the failure bit occurred during execution of the transaction. For example, a failure bit corresponding to an "unsupported instruction" cause of transaction failure may be set if an unsupported instruction is executed during the transaction. Similarly, a failure bit corresponding to an "asynchronous interrupt" cause of transaction failure may be set if an asynchronous interrupt occurs during execution of the transaction.

The CPS register may additionally include a set of advice bits that record an advice state of the transaction. The advice state may provide advice-based feedback that enables the program to better respond to the transaction failure. Consequently, the advice state may be based on the failure state of the transaction. In other words, the advice bits of the CPS register may be calculated using the failure bits of the CPS register. The advice state may also be based on additional information associated with the transaction failure. For example, the advice state may be calculated using a program counter associated with the transaction, a history of one or more recent transaction attempts, a number of cache misses encountered during the transaction, an address associated with the transaction failure (e.g., TLB address, address of conflicting memory access, etc.), and/or a processor version associated with processor 101.

The advice state may include a recommended course of action for the program. In particular, the advice state may specify that the program retry the transaction (e.g., immediately or after some delay), perform a remedial action to address a source of the transaction failure, and/or bypass the failure. For example, the advice state may recommend that the program retry the transaction immediately if the transaction failure is possibly caused by misspeculation or by a conflicting memory operation. On the other hand, if the transaction failure is possibly caused by a factor associated with "best effort" transactional execution such as a TLB miss, the advice state may recommend that the program cause a TLB mapping to the missing address to be generated prior to retrying the transaction.

Finally, the advice state may recommend that the program use an alternative code path to bypass the failure if retries of the transaction are unlikely to succeed. More specifically, transactions that fail due to unsupported instructions, trap instructions, and/or resource exhaustion may require bypassing using alternative code paths. In one or more embodiments, alternative code paths used to bypass failures are provided using software transactional execution mechanisms. For example, the program may use a software library instead of processor 101 to begin, execute, and commit transactions if the transactions are not supported by processor 101. Alternative code paths may also involve executing critical sections while holding locks. For example, the program may attempt to execute a lock-protected critical section using the transaction without acquiring a lock for the critical section. If the transaction fails, the program may acquire the lock to facilitate the successful execution of the critical section.

Those skilled in the art will appreciate that information regarding the failure state and/or advice state of transactional execution may be provided by processors 101-102 in a variety of ways. For example, the failure state and advice state may be stored in different registers and/or written to main memory. Moreover, processors 101-102 may only provide the advice state to the program and simply use the failure state to compute the advice state. Along the same lines, the failure state and/or advice state may encode additional information that further allows the program to implement an appropriate response to the transaction failure. For example, additional bits of a register may be used to indicate the processor version of processor 101 used to execute the transaction, an address to which a conflicting memory operation is made, a number of processor cycles used to execute the failed transaction, additional options for responding to the transaction failure, and/or other information associated with the transaction failure.

Similarly, CPS registers 123-126 may be used in traditional lock-based synchronization instead of transactional execution. For example, caches, TLBs, branch predictors, and/or other components associated with processors 101-102 may be initialized and/or warmed up prior to acquiring a lock. CPS registers 123-126 may thus be used to provide feedback regarding misspeculation during the warm-up process.

Figure 2:
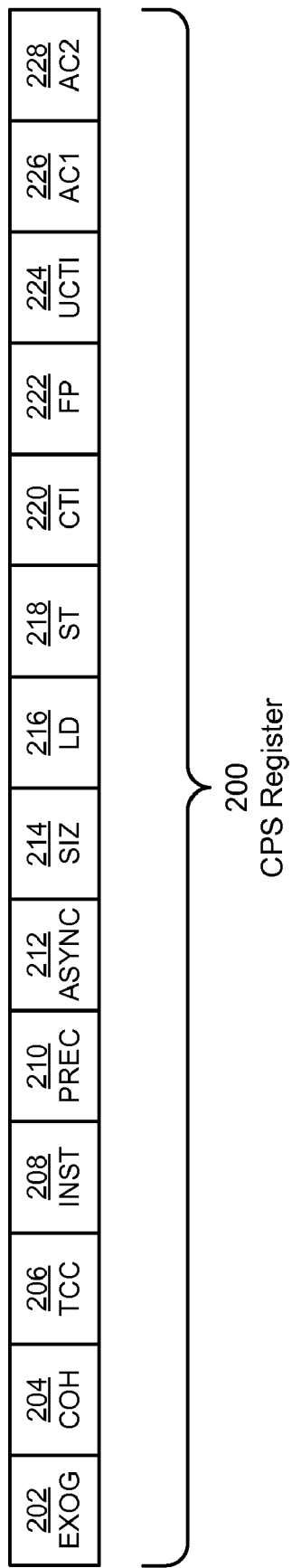
FIG. 2 shows a CPS register in accordance with an embodiment.

FIG. 2 shows a CPS register 200 in accordance with an embodiment. As described above, CPS register 200 may be used to provide feedback regarding the causes of a transaction failure. CPS register 200 includes a number of failure bits 202-224, with each bit providing information about a possible cause of failure in a transaction. CPS register 200 also includes two advice bits 226-228, which may recommend an appropriate response to the transaction failure. The contents of CPS register 200 may be provided to a program for which the transaction is executed to facilitate a response to the transaction failure by the program.

An EXOG bit 202 in CPS register 200 may indicate that intervening code has run and that the contents of CPS register 200 are invalid. For example, EXOG bit 202 may be set if a context switch occurs after the transaction failure but before the program is able to read CPS register 200. Similarly, a COH bit 204 may be used to indicate a conflicting memory operation (e.g., by a different thread) as the source of the transaction failure. As a result, a transaction failure with COH bit 204 set may prompt the program to retry the transaction.

A TCC bit 206 may indicate that a trap is taken, thus causing the transaction to fail. The trap may be included in the program to deliberately cause the transaction to fail under certain conditions specified in the trap instruction. Furthermore, the program may include specific mechanisms for handling the transaction failure if the transaction failure is caused by the trap. An INST bit 208 bit may represent the execution of an unsupported instruction inside the transaction. For example, function calls may not be supported in transactional execution. Consequently, the inclusion of a function call in the transaction may cause INST bit 208 to be set.

A PREC bit 210 may indicate the occurrence of a precise exception during the transaction. For example, PREC bit 210 may be set if an instruction translation lookaside buffer (ITLB) miss, a divide-by-zero error, and/or a software trap occur during the transaction. Next, an ASYNC bit 212 may be set if an asynchronous interrupt occurs during the transaction. For example, the asynchronous interrupt may cause the transaction to fail by triggering a context switch and executing an interrupt handler before the transaction completes.

A SIZ bit 214 may indicate that the transaction has exceeded the capacity of a hardware resource. For example, SIZ bit 214 may be set if too many instructions are deferred due to cache misses. On the other hand, an LD bit 216 may represent an eviction of a cache line in the transaction's read set by the transaction. In other words, LD bit 216 may be set if the transaction performs too many loads to fit into the L1 cache. An ST bit 218 may represent a TLB miss; as discussed above, a failed transaction with ST bit 218 set may require a TLB mapping to be made to correct the TLB miss prior to retrying the transaction.

A CTI bit 220 and UCTI bit 224 may indicate failures related to misspeculation. In particular, CTI bit 220 may be set if a branch is mispredicted, while UCTI bit 224 may be set if a load on which a branch depends is not yet resolved. In other words, UCTI bit 224 may correspond to a misspeculation bit in CPS register 200 that indicates the presence of a possible misspeculation during the transaction. As a result, the program may retry the transaction if UCTI bit 224 is set such that the load may be resolved when the branch is executed; the transaction may succeed if the branch was incorrectly predicted, or the transaction may fail with UCTI bit 224 cleared, suggesting that the transaction may have failed due to reasons other than misspeculation.

Furthermore, if the branch prediction associated with UCTI bit 224 is determined to be correct before the transaction fails, UCTI bit 224 may be cleared. On the other hand, if the branch prediction is determined to be incorrect, CTI bit 220 may be set. The setting and clearing of UCTI 224 is described in a co-pending non-provisional application by the same inventors as the instant application and filed on the same day as the instant application entitled "Facilitating Transactions Through Feedback About Misspeculation," having Ser. No. 12/439,447, and filing date 29 Jun. 2009, which is incorporated herein by reference.

Finally, an FP bit 222 may be set if a difficult instruction, such as floating-point division, is encountered. Because each bit represents a different potential source of failure, the program may react differently to different values of CPS register 200 upon encountering a transaction failure. For example, a transaction failure with INST bit 208 or TCC bit 206 set may require the program to execute an alternative code path to bypass the transaction. A transaction failure with EXOG bit 202, COH bit 204, CTI bit 220, and/or UCTI bit 224 set may cause the program to retry the transaction one or more times, with or without pausing or performing a remedial action before each retry.

As described above, AC1 bit 226 and AC2 bit 228 may correspond to advice bits in CPS register 200 that provide advice-based feedback to the program. In other words, AC1 bit 226 and AC2 bit 228 may provide advice to the program regarding the optimal response to the transaction failure. In particular, AC1 bit 226 and AC2 bit 228 may encode one of four advice codes (e.g., 00, 01, 10, 11). Furthermore, the advice codes may correspond to "no advice," "retry immediately," "retry with remediation," and/or "unlikely to succeed."

In one or more embodiments, the advice code stored in AC1 bit 226 and AC2 bit 228 is calculated using failure bits 202-224. In other words, the advice state stored in CPS register 200 may be based on the possible failure causes indicated by failure bits 202-224. For example, an advice code of 01 (e.g., "retry immediately") may be stored in AC1 bit 226 and AC2 bit 228 if COH bit 204 and/or UCTI bit 224 are set. An advice code of 10 (e.g., "retry with remediation") may be stored in AC1 bit 226 and AC2 bit 228 if ST bit 218 is set so that the program may correct a TLB miss by causing a TLB mapping to be created prior to retrying the transaction. An advice code of 11 (e.g., "unlikely to succeed") may be stored in AC1 bit 226 and AC2 bit 228 if INST bit 208, TCC bit 206, and/or FP bit 222 are set. Finally, an advice code of 00 (e.g., "no advice") may be stored in AC1 bit 226 and AC2 bit 228 if a combination of failure bits 202-224 is set that does not correspond to a known cause of transaction failure or the processor does not implement advice codes.

Those skilled in the art will appreciate that CPS register 200 may provide advice-based feedback to the program in a variety of ways. For example, CPS register 200 may include additional advice bits for encoding other options for responding to transaction failures. Such additional advice bits may distinguish between retrying immediately and retrying after some delay, and/or may recommend specific remedial actions (e.g., alternative code path, causing a TLB mapping to be generated, etc.) for responding to specific transaction failures.

Figure 3:
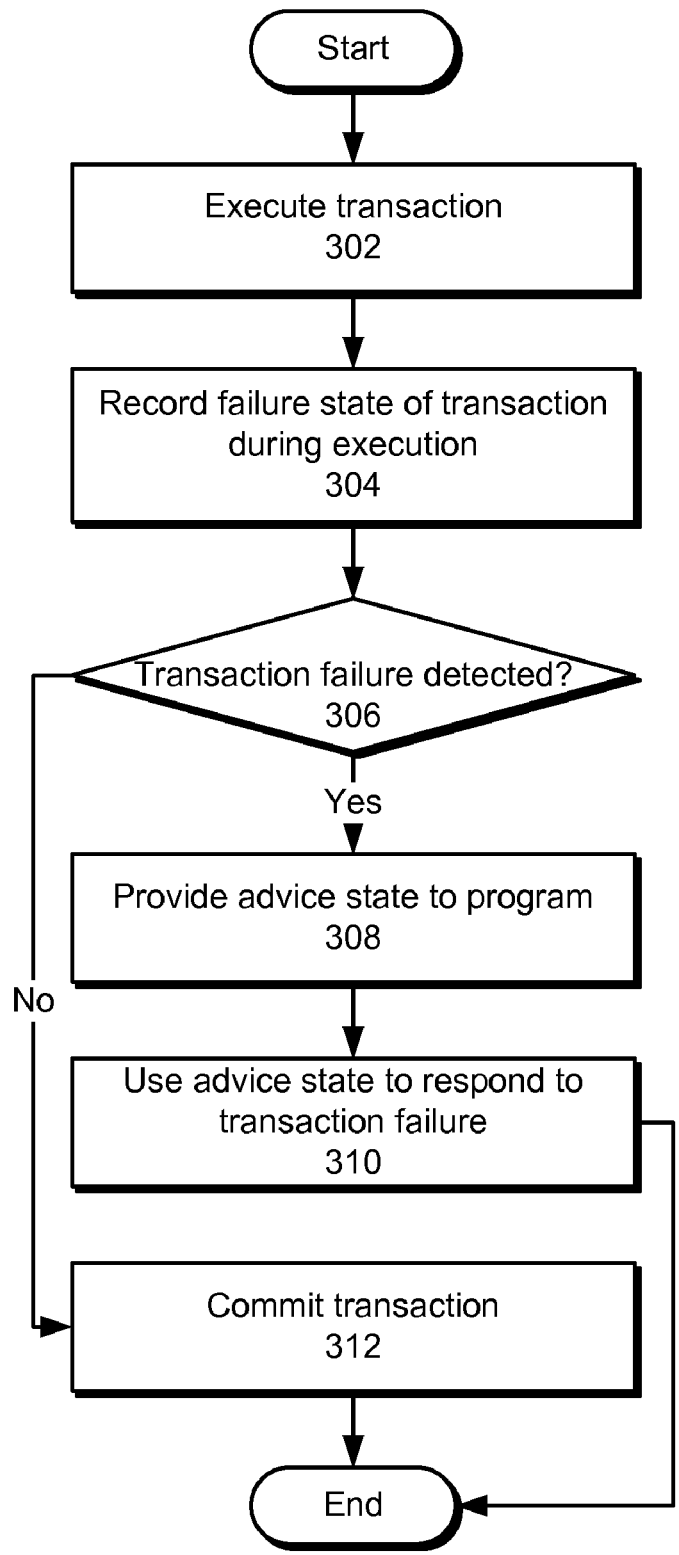
FIG. 3 shows a flowchart illustrating the process of facilitating the execution of a transaction in accordance with an embodiment.

FIG. 3 shows a flowchart illustrating the process of facilitating the execution of a transaction in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

First, the transaction is executed (operation 302) for a program in a hardware-supported transactional memory system. The hardware-supported transactional memory system may include a processor containing a storage apparatus and an execution mechanism for executing the transaction. Next, a failure state of the transaction is recorded during execution of the transaction (operation 304) by the storage apparatus. The storage apparatus may correspond to a CPS register associated with the program. In particular, the CPS register may record the failure state of the transaction using a set of failure bits.

The CPS register may be used to provide feedback about the transaction if a transaction failure is detected (operation 306). If no transaction failure is detected, the transaction is committed (operation 312) to the architectural state of the processor. However, if a transaction failure is detected, an advice state associated with the failure state is provided to the program (operation 308) to facilitate a response to the transaction failure by the program. As described above, the advice state may be stored in a set of advice bits in the CPS register.

In addition, the advice state may correspond to a recommended course of action regarding the transaction failure. For example, the advice state may recommend that the program retry the transaction immediately, retry the transaction after a delay, retry the transaction after remediation, and/or bypass the transaction using an alternative code path. The program may examine the contents of the CPS register to determine the cause of the transaction failure and respond to the transaction failure (operation 310). For example, the program may execute an alternative code path if the CPS register indicates that an unsupported instruction was executed during the failed transaction and if the advice bits recommend the alternative code path. On the other hand, the program may cause a TLB mapping to be generated to correct a TLB miss prior to retrying the transaction if the CPS register shows that a TLB miss is responsible for the transaction failure and if the advice bits recommend retrying after remediation.

Figure 4:
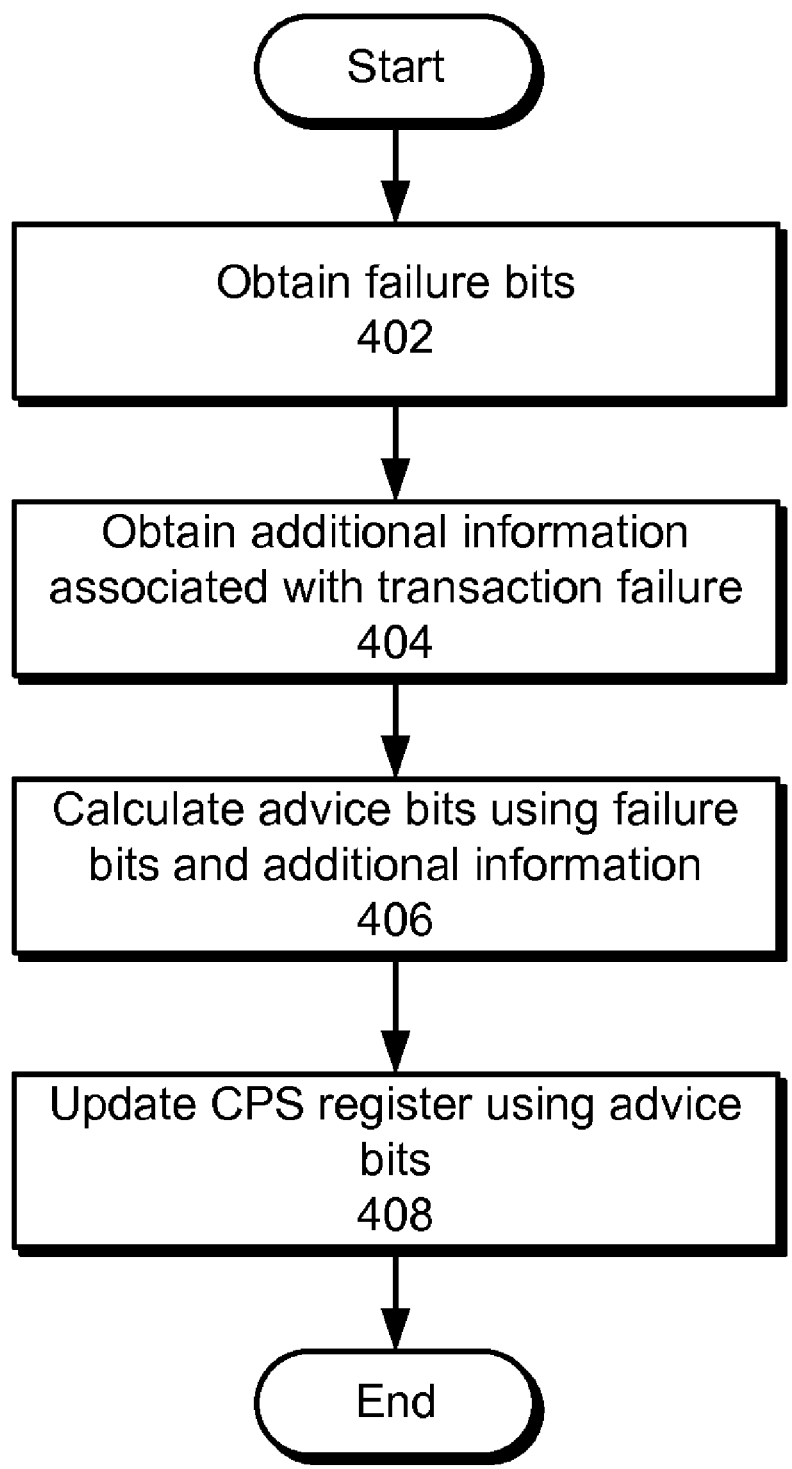
FIG. 4 shows a flowchart illustrating the process of updating the advice bits of a CPS register in accordance with an embodiment.

FIG. 4 shows a flowchart illustrating the process of updating the advice bits of a CPS register in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

First, a set of failure bits from the CPS register is obtained (operation 402). The failure bits may encode one or more possible causes of a failed transaction. For example, each failure bit may correspond to a possible cause of transaction failure. The failure bit may be set if the corresponding possible cause occurs during the execution of the transaction. The failure bits may be obtained upon detecting the failed transaction to assess the possible causes of the failed transaction.

Additional information associated with the transaction failure may also be obtained (operation 404). For example, a program counter associated with the transaction, a history of recent transaction attempts, a number of cache misses encountered during the transaction, an address associated with the transaction failure, and/or a processor version associated with the hardware transactional memory system used to execute the transaction may be obtained.

Next, a set of advice bits in the CPS register is calculated using the failure bits and the additional information (operation 406). In particular, the advice bits may be calculated by first establishing one or more possible causes of transaction failure based on the failure bits and the additional information. For example, a possible cause of transaction failure due to an evicted cache line and/or misspeculation may be confirmed or rejected based on recent attempts at executing the transaction and/or a number of cache misses encountered during the transaction.

The CPS register is then updated using the advice bits (operation 408). As described above, the CPS register may include two advice bits that encode one of four advice codes corresponding to "no advice," "retry immediately," "retry with remediation," and/or "unlikely to succeed." The CPS register may also include more than two advice bits if finer-grained advice is offered to the program. For example, a number of additional advice bits may be used to encode advice that distinguishes between retrying immediately and retrying after delay, as well as advice that recommends specific remedial actions for specific types of transaction failures. As a result, the advice bits of the CPS register may provide advice-based feedback regarding the failed transaction to allow a program associated with the failed transaction to respond successfully to the failed transaction.

The additional advice bits may also encode additional feedback regarding the transaction failure. For example, the additional advice bits may include some of the additional information used to calculate the advice bits, such as memory addresses associated with possible causes of the transaction failure, the number of cache misses encountered during the transaction, and/or the number of processor cycles used to execute the failed transaction. The additional advice bits may enable the program to prepare an optimal response to the transaction failure. For example, the additional advice bits may allow the program to implement remediation mechanisms such as preloading a TLB entry before retrying.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the execution of a transaction for a program in a hardware-supported transactional memory system, comprising:
   recording a failure state of the transaction using at least one failure bit in a set of failure bits in a checkpoint status (CPS) register in a register file during execution of the transaction;
   detecting a transaction failure associated with the transaction;
   calculating an advice state associated with the recorded failure state by using at least one of a number of cache misses encountered during the transaction, an address associated with the transaction failure, and a processor version associated with the hardware-supported transactional memory system; and
   providing the advice state to the program to enable the program to facilitate a response to the transaction failure by the program.

2. The computer-implemented method of claim 1, wherein the advice state is used by the program to:
   retry the transaction;
   perform a remedial action to address a source of the transaction failure; or
   bypass the transaction.

3. The computer-implemented method of claim 2, wherein bypassing the transaction failure involves executing an alternative code path provided by software transactional execution mechanisms.

4. The computer-implemented method of claim 2, wherein bypassing the transaction failure involves executing a critical section while holding a lock.

5. The computer-implemented method of claim 1, wherein the advice state is recorded in the CPS using at least one advice bit in a set of advice bits in the CPS.

6. The computer-implemented method of claim 5, wherein the advice bits encode an advice code corresponding to:
   no advice;
   retry immediately;
   retry after a delay;
   retry with remediation; or
   unlikely to succeed.

7. The computer-implemented method of claim 1, wherein the advice state is calculated using the failure bits.

8. The computer-implemented method of claim 7, wherein the advice state is further calculated using at least one of a program counter and a recent transaction attempt.

9. The method of claim 1, wherein the register file in which the CPS is located is located in a processor that is executing the transaction.

10. A system for facilitating the execution of a transaction for a program in a hardware-supported transactional memory system, comprising:
    a storage apparatus configured to record a failure state of the transaction using at least one failure bit in a set of failure bits in a checkpoint status (CPS) register in a register file during execution of the transaction; and
    an execution mechanism within a processor, wherein the execution mechanism is configured to:
       execute the transaction;
       detect a transaction failure associated with the transaction;
       calculate an advice state associated with the recorded failure state by using at least one of a number of cache misses encountered during the transaction, an address associated with the transaction failure, and a processor version associated with the hardware-supported transactional memory system; and
       provide an advice state associated with the recorded failure state to the program to facilitate a response to the transaction failure by the program.

11. The system of claim 10, wherein the advice state is used by the program to:
    retry the transaction;
    perform a remedial action to address a source of the transaction failure; or
    bypass the transaction.

12. The system of claim 11, wherein bypassing the transaction failure involves executing an alternative code path provided by software transactional execution mechanisms.

13. The system of claim 11, wherein bypassing the transaction failure involves executing a critical section while holding a lock.

14. The system of claim 10, wherein the advice state is recorded in the CPS using at least one advice bit in a set of advice bits in the CPS.

15. The system of claim 14, wherein the advice bits encode an advice code corresponding to:
    no advice;

retry immediately;
retry after a delay;
retry with remediation; or
unlikely to succeed.

16. The system of claim 10, wherein the advice state is calculated using the failure bits.

17. The system of claim 16, wherein the advice state is further calculated using at least one of a program counter and a recent transaction attempt.

* * * * *